May 13, 1952     W. P. EWALD     2,596,667
TRANSPARENCY INSERTING AND POSITIONING DEVICE
Filed Dec. 3, 1948
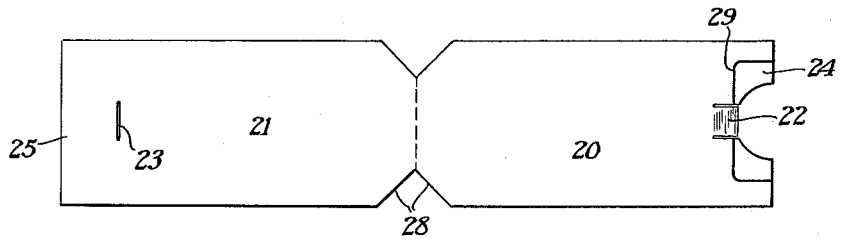
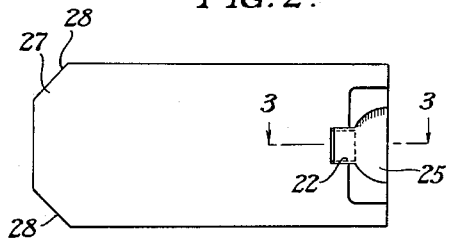
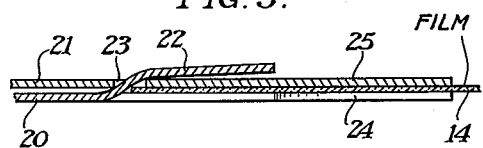
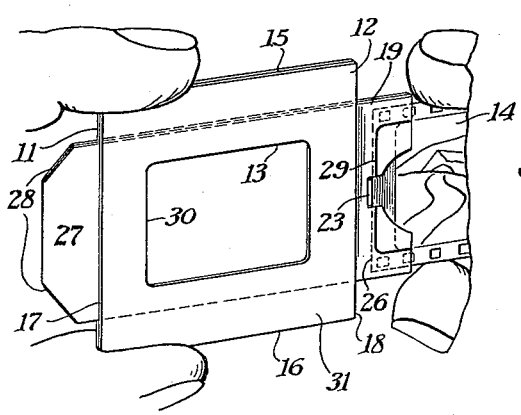
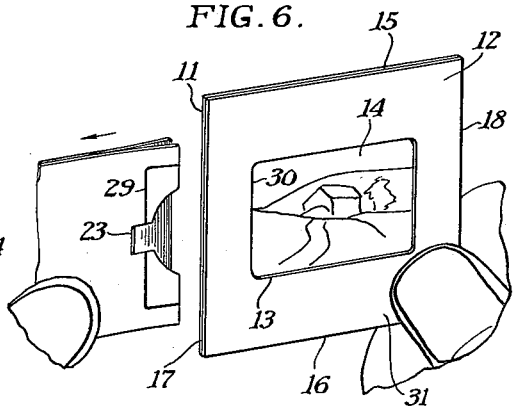
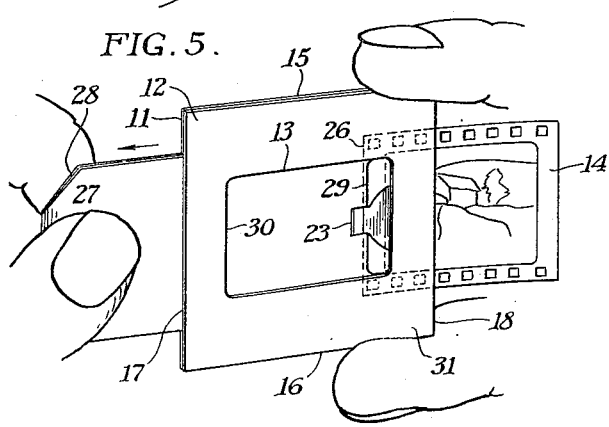
WILLIAM P. EWALD
INVENTOR
BY
ATTORNEYS Patented May 13, 1952

2,596,667

UNITED STATES PATENT OFFICE 2,596,667

TRANSPARENCY INSERTING AND POSITIONING DEVICE

William P. Ewald, Rochester, N. Y., assignor to Eastman Kodak Company, Rochester, N. Y., a corporation of New Jersey Application December 3, 1948, Serial No. 63,265

11 Claims. (Cl. 40—158)

The present invention relates to a mount for transparencies for use in projecting machines.

Many mounts of this type now on the market are formed by arranging two cardboard sheets in overlying relation. These sheets are provided with registering apertures adapted to frame the image area of the transparency, as is well known. In placing transparencies in such mounts, difficulty is encountered in eliminating finger marks on the faces of the print, the disadvantages of which are readily apparent to those familiar with such mounts.

In order to overcome this difficulty and to facilitate the placing or positioning of the transparency in the mount and in registry with the apertures thereof, the present invention provides an inserting strip or device which is positioned between the two mount members and which has a length greater than the width of the mount so as to project beyond the opposite unsealed edges thereof, the two remaining edges of the mount being adhesively connected. One end of this inserting and positioning strip is provided with means for connecting the transparency thereto and in a definite relation therewith. The pulling of the strip then serves to slide or feed the transparency between the two mount members. When the transparency has been brought in registry with the apertures of the mount, the strip is disconnected from the transparency and is pulled out of the mount, leaving the transparency in proper assembled and registering relation with the apertures of the mount members. The open sides of the mount may then be sealed to retain the transparency in proper assembled position therein.

The invention has as its principal object the provision of a slidable device carried by the mount for facilitating the inserting and positioning of a transparency in proper relation in the mount.

A further object of the invention is the provision of a simple and effective arrangement for connecting the transparency releasably to the inserting and positioning device.

Still another object of the invention is the provision of means for accurately positioning the transparency relative to the slidable device.

And another object of the invention is the provision of cooperating members on the sliding device and the mount to indicate when the transparency has been moved into accurate registration with the mount apertures.

Another object of the invention is the provision of a transparency inserting and positioning device which is simple in construction, easy to operate, inexpensive to manufacture and highly effective in use.

To these and other ends, the invention resides in certain improvements and combinations of parts, all as will be hereinafter more fully described, the novel features being pointed out in the claims at the end of the specification.

In the drawings:

Fig. 1 is a plan view of the slidable device or strip for inserting and positioning the transparency in the mount;

Fig. 2 is a view similar to Fig. 1 but with the strip in its folded or operative relation;

Fig. 3 is a longitudinal sectional view taken on line 3—3 of Fig. 2 and on a larger scale than the latter, showing the relation of the transparency positioning and connecting means on the inserting and positioning strip;

Fig. 4 is a perspective view of a transparency mount, showing the relation thereto of the inserting strip or device thereto with the transparency positioned in connected relation to the device;

Fig. 5 is a view similar to Fig. 4 but showing the transparency partially drawn into position between the slide members; and Fig. 6 is a view similar to Figs. 4 and 5 but showing the transparency in its final position in the mount, and the positioning slide or device withdrawn.

Similar reference numerals throughout the various views indicate the same parts.

The transparency positioning device or strip of the present invention is shown in the present embodiment and by way of illustration only, in connection with a mount formed from two equal size sheets 11 and 12 of any suitable material, usually cardboard, formed with registering apertures, only one of which is shown at 13, to frame the image area of a transparency 14. Such cardboard sheets may be connected adhesively by a strip of adhesive positioned between the sheets adjacent to marginal edges thereof. As the particular structure of the sheets 11 and 12 and the method of connecting do not form a part of the present invention, details thereof are not illustrated or described. One such type of mount and the method of connecting such sheets adhesively is shown and described in the patent to Staehle No. 2,184,007, issued December 19, 1939, to which reference may be had for the detailed disclosure.

In the structure of the present invention, only the top and bottom edges 15 and 16 of the mount sheets are initially sealed, and the side edges 17 and 18 are left unsealed until the transparency 14 is positioned therein, as shown in Fig. 4. A transparency inserting and positioning device or strip 19 is positioned in the mount in the position shown in Fig. 4, when received by the customer. This device 19 is in the form of a single sheet of paper or similar material folded at its mid point to provide a pair of overlying strips 20 and 21, as shown in Figs. 2 and 3. This folded paper sheet has the leaf 20 thereof, adjacent the free end, formed with a tongue 22 adapted to be inserted in and projected through a registering slot 23 in the leaf 21, as clearly shown in Fig. 3. The free ends of the leaves 21 and 22 beyond the tongue 22 and the slot 23 provide transparency-engaging flaps 24 and 25 which are adapted to engage the opposite faces of the transparency 14 adjacent an edge 26 thereof, as will be later more fully described. The device 19 is positioned between the mount sheets 11 and 12 so that the slot and tongue arrangement and the transparency-engaging flaps project beyond the edges 18, while the folded end of the device 19 projects beyond the opposite edge 17 to provide a gripping tab 27, as shown in Fig. 4. If desired, the corners of the tab may be cut away, as shown at 28.

Fig. 4 shows the relation of the mount and the inserting device or strip as received by the customer. To insert and position the transparency 14 between the mount sheets 11 and 12, and in registry with the aperture 13, thereof, the leading end 26 of the transparency is positioned between the flaps 24 and 25, and is moved inwardly until the edge 26 abuts the tongue 22. The tongue 22 then serves to limit the movement of the transparency and positions the latter relative to the device 19, all is illustrated in Figs. 3 and 4. During this operation, the transparency may be held by its edges only, as shown in Fig. 4, thus removing any possibility of forming fingerprints on the faces of the transparency, the advantages of which are deemed apparent to those familiar with transparency mounting.

The parts are then in the position shown in Figs. 3 and 4. Now the tab 27 is gripped and the mount is held at the top and bottom edges 15 and 16 adjacent to side edges 18, as illustrated in Fig. 5. The tab 27 is then pulled to the left to slide the device 19 to the left and between the members 11 and 12 to bring the flaps 24 and 25 against the opposite faces of the transparency 14, as shown in Fig. 3, to connect the latter to the device 19. Further leftward sliding of the device gradually draws the transparency 14 between the mount members 11 and 12, as shown in Fig. 5. When, however, the device 19 has been pulled to a point to position the image area of the transparency in accurate registration with the aperture 13, an index marked 29 on the left 20, adjacent tongue 22, is finally brought into registry with the trailing edge 30 of the aperture 13.

Such registration serves to indicate to the operator that the transparency 14 has been moved to a position to bring the image area thereof into registry with the aperture 13. It is now necessary to remove the device 19 completely from the mount without disturbing the position of the transparency relative thereto. To secure this result, pressure is applied to the lower right hand corner 31 of the mount by any suitable means, such, for example, by pinching with the fingers, as shown in Fig. 6. Such pressure serves to clamp the right portion of the sheets 11 and 12 to also clamp the lower corner of the transparency to retain the latter in position in the mount. The device 19 may be removed completely by further pulling movement to the left, as shown in Fig. 6, thus removing the device and leaving the transparency within the mount and positioned accurately relative to the apertures thereof.

The present invention thus provides a single and effective device for drawing or inserting a transparency between the paper sheets of a mount, and for positioning the transparency in accurate relation to the mount apertures. After the transparency has been thus positioned and the positioning device removed, pressure and/or heat may be applied to the edges 17 and 18 to seal the latter to retain the transparency in position, as is apparent. The transparency is positioned relative to the device 19 and is connected thereto so as to move as a unit therewith between the mount sheets. The inserting and positioning device is simple in construction, easy to operate, inexpensive to manufacture and highly effective in use.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

What I claim and desire to secure by Letters Patent of the United States of America is:

1. In a transparency mount, the combination with a pair of opaque overlying frame members formed with registering apertures for framing a transparency when positioned between said members, of an inserting element slidably positioned between said members, means on said element engaging said transparency adjacent one end only for connecting a transparency to said element, means for sliding said element to draw said transparency between said members, and an index marked on said element movable into registry with an edge of one of said apertures to position said transparency in registry with said apertures, said element being disconnected from the registered transparency and withdrawn completely from between said members.

2. In a transparency mount, the combination with a pair of opaque overlying frame members formed with registering apertures for framing a transparency when positioned between said members, of an inserting element slidably positioned between said members, overlying flaps on said element engaging said transparency adjacent one end only for connecting a transparency to said element, tongue and slot means on said element to position said transparency relative to said element, and means for sliding said element and transparency as a unit between said members to draw said transparency between said members and in registry with said apertures.

3. In a transparency mount, the combination with a pair of opaque overlying frame members formed with registering apertures for framing a transparency when positioned between said members, of an inserting element slidably positioned between said members, means on said element engaging said transparency adjacent one edge only for connecting a transparency to said element, means adjacent said engaging means engaged by said edge to position said transparency on said element, means for sliding said element to draw said transparency between said members, and cooperating parts on said members and said element to secure registration of said transparency with said apertures.

4. In a transparency mount, the combination with a pair of overlying frame members formed with registering apertures for framing a transparency when positioned between said members, of a strip loosely positioned between said members and having ends projecting from the opposite sides of said members, means for attaching a transparency to one end of said strip, and a tab formed on the other end of said strip for sliding said strip to draw said transparency between said members and into registry with said apertures.

5. In a transparency mount, the combination with a pair of overlying frame members formed with registering apertures for framing a transparency when positioned between said members, of a strip loosely positioned between said members and having ends projecting from the opposite side of said members, means for attaching a transparency to one end of said strip, means on said one end for positioning said transparency relative thereto, and means for drawing said strip and transparency between said members to position said transparency therebetween and in registry with said apertures.

6. In a transparency mount, the combination with a pair of overlying frame members formed with registering apertures for framing a transparency when positioned between said members, of a strip loosely positioned between said members and having ends projecting from the opposite sides of said members, means for attaching a transparency to one end of said strip, means including a tongue and slot arrangement formed on one end of said strip for positioning said transparency relative to said one end, and a tab formed on the other end of said strip for sliding the latter between said members for inserting said transparency in position therebetween and in registry with said apertures.

7. In a transparency mount, the combination with a pair of overlying frame members formed with registering apertures for framing a transparency when positioned between said members, of a strip loosely positioned between said members and having ends projecting from the opposite sides of said members, means for attaching a transparency to one end of said strip, means for drawing said strip and transparency between said members, and cooperating elements on said strip and members for securing proper registration of said transparency with said apertures.

8. In a transparency mount, the combination with a pair of overlying frame members formed with registering apertures for framing a transparency when positioned between said members, of a folded strip of sheet material slidably positioned between said members and having ends projecting from opposite sides of said members, means in one end of said strip for receiving an edge of said transparency, means on said strip for positioning said edge relative to said strip, and means for drawing said strip through said mount to slide said transparency between said members and in registry with said apertures.

9. In a transparency mount, the combination with a pair of overlying frame members formed with registering apertures for framing a transparency when positioned between said members, of a folded strip of sheet material slidably positioned between said members and having ends projecting from opposite sides of said members, means on one end of said strip for receiving an edge of said transparency, means on said strip for positioning said edge relative to said strip, means for drawing said strip through said mount to slide said transparency between said members and in registry with said apertures, and an index mark on said strip adapted to cooperate with an edge of one of said apertures to indicate the registration of said transparency with said apertures.

10. In a transparency mount, the combination with a pair of overlying frame members formed with registering apertures for framing a transparency when positioned between said members, of a folded strip of sheet material slidably positioned between said members and having ends projecting from opposite sides of said members, a tongue formed from one of the folds of said strip adjacent the free end thereof, said other fold adjacent its free end being formed with a slot to receive said tongue, said tongue forming an abutting stop against which an edge of said transparency may engage to position said edge relative to the free ends of said strip, terminal flaps formed on said folds between said stop and said free ends for engaging opposite faces of said transparency adjacent said edge thereof to connect said transparency to said strip, and a tab formed on the opposite end of said strip for sliding the latter relative to said mount to slide said transparency between said members and in registry with said apertures.

11. In a transparency mount, the combination with a pair of overlying frame members formed with registering apertures for framing a transparency when positioned between said members, of a folded strip of sheet material slidably positioned between said members and having ends projecting from opposite sides of said members, a tongue formed from one of the folds of said strip adjacent the free end thereof, said other fold adjacent its free end being formed with a slot to receive said tongue, said tongue forming an abutting stop against which an edge of said transparency may engage to position said edge relative to the free ends of said strip, terminal flaps formed on said folds between said stop and said free ends for engaging opposite faces of said transparency adjacent said edge thereof to connect said transparency to said strip, a tab formed on the opposite end of said strip for sliding the latter relative to said mount to slide said transparency between said members and in registry with said apertures, an edge on one of said apertures, and an index mark on said strip adjacent said tongue adapted to be brought into registry with said aperture edge when said strip is slid relative to said mount to indicate the registration of said transparency with said apertures.

WILLIAM P. EWALD.

REFERENCES CITED

The following references are of record in the file of this patent:

UNITED STATES PATENTS

| Number | Name | Date |
|---|---|---|
| 2,184,007 | Staehle | Dec. 19, 1939 |
| 2,186,827 | Engel | Jan. 9, 1940 |
| 2,206,561 | Engel | July 2, 1940 |
| 2,283,837 | Whitfield et al. | May 19, 1942 |
| 2,498,738 | Lewis | Feb. 28, 1950 |